US012377811B2

United States Patent
Perez

(10) Patent No.: US 12,377,811 B2
(45) Date of Patent: Aug. 5, 2025

(54) KEYLESS DUAL POWER SYSTEM CONTROL FOR ELECTRIC MOTOR VEHICLES

(71) Applicant: Honda Motor Co., Ltd., Tokyo (JP)

(72) Inventor: Jose A. Perez, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 353 days.

(21) Appl. No.: 18/175,982

(22) Filed: Feb. 28, 2023

(65) Prior Publication Data
US 2024/0286578 A1    Aug. 29, 2024

(51) Int. Cl.
| | | |
|---|---|---|
| G06F 17/00 | (2019.01) | |
| B60L 58/12 | (2019.01) | |
| B60R 16/033 | (2006.01) | |
| B60R 25/045 | (2013.01) | |
| B60R 25/24 | (2013.01) | |
| B60R 25/31 | (2013.01) | |
| B60R 25/34 | (2013.01) | |

(52) U.S. Cl.
CPC ............ *B60R 25/045* (2013.01); *B60L 58/12* (2019.02); *B60R 16/033* (2013.01); *B60R 25/24* (2013.01); *B60R 25/31* (2013.01); *B60R 25/34* (2013.01)

(58) Field of Classification Search
CPC ..... B60R 25/045; B60R 16/033; B60R 25/24; B60R 25/31; B60R 25/34; B60L 58/12; B60L 50/50; B60L 2250/20; B60L 2250/22
USPC ......................................................... 701/22
See application file for complete search history.

(56) References Cited

U.S. PATENT DOCUMENTS

| | | | |
|---|---|---|---|
| 6,832,151 B2 | 12/2004 | Kumazai et al. | |
| 7,489,101 B2 * | 2/2009 | Bockelmann ......... | B60W 10/26 320/104 |
| 7,665,557 B2 * | 2/2010 | Hughes ................. | B60W 20/00 180/65.28 |
| 10,266,178 B2 | 4/2019 | Khafagy et al. | |

(Continued)

FOREIGN PATENT DOCUMENTS

| | | |
|---|---|---|
| CN | 104648223 A | 5/2015 |
| CN | 208789508 U | 4/2019 |

(Continued)

OTHER PUBLICATIONS

Understanding Current Sensing in HEV/EV Batteries (Year: 2017).*

*Primary Examiner* — Ronnie M Mancho
(74) *Attorney, Agent, or Firm* — Plumsea Law Group, LLC

(57) ABSTRACT

A method for keyless dual power system control for an electric motor vehicle is provided. The electric motor vehicle including a powertrain electronic control unit (ECU) and an infotainment system that are independently powered. The method includes receiving a user authentication from a wireless device to authenticate a user, receiving a driver's door status from a door sensor, receiving a driver presence signal from a seat pressure sensor, and determining whether the driver's door status from the door sensor indicates the driver's door is in an open status. The method also includes controlling the infotainment system to be in an on status and controlling the powertrain ECU to be in an off status upon receiving the user authentication, determining the driver's door is in the open status, and receiving the driver presence signal.

20 Claims, 12 Drawing Sheets

(56) References Cited

U.S. PATENT DOCUMENTS

| | | | |
|---|---|---|---|
| 10,519,917 B2* | 12/2019 | Lee | B60W 10/08 |
| 10,576,795 B2* | 3/2020 | Ciovnicu | B60C 23/002 |
| 10,745,013 B1 | 8/2020 | Herhusky et al. | |
| 11,066,045 B2 | 7/2021 | Tamaru | |
| 11,208,831 B2 | 12/2021 | Kamata et al. | |
| 11,225,248 B2 | 1/2022 | Tsuji et al. | |
| 11,405,779 B2* | 8/2022 | Boyd | H04W 4/46 |
| 11,447,096 B2 | 9/2022 | Toyooka et al. | |
| 11,576,047 B2* | 2/2023 | Draper | H04L 67/56 |
| 2004/0030470 A1* | 2/2004 | De La Salle | B60W 10/08 |
| | | | 180/65.25 |
| 2006/0049797 A1* | 3/2006 | Hope | B60W 10/06 |
| | | | 320/104 |
| 2011/0068895 A1 | 3/2011 | Gee et al. | |
| 2015/0008804 A1 | 3/2015 | Geissenhoener | |
| 2017/0197523 A1* | 7/2017 | Magaña | B60K 35/28 |
| 2017/0240111 A1* | 8/2017 | Appukutty | B60N 2/289 |
| 2018/0281797 A1* | 10/2018 | Berels | B60K 17/344 |
| 2018/0297422 A1* | 10/2018 | Ciovnicu | B60C 23/00318 |
| 2019/0340846 A1* | 11/2019 | Jayaraman | G07C 5/0816 |
| 2020/0186620 A1* | 6/2020 | Golgiri | B60W 30/16 |
| 2020/0327749 A1* | 10/2020 | Mo | B60K 35/22 |
| 2021/0146911 A1 | 5/2021 | Yan et al. | |
| 2022/0014907 A1* | 1/2022 | Boyd | H04W 4/46 |
| 2022/0219666 A1* | 7/2022 | Nagata | G01C 21/3661 |
| 2023/0271509 A1* | 8/2023 | Harshe | B60L 1/02 |
| | | | 701/22 |
| 2024/0286578 A1* | 8/2024 | Perez | B60R 25/24 |

FOREIGN PATENT DOCUMENTS

| | | | | |
|---|---|---|---|---|
| CN | 214084163 U | * | 8/2021 | |
| CN | 113452750 A | * | 9/2021 | |
| CN | 112572228 B | | 7/2022 | |
| DE | 10155128 A1 | * | 6/2002 | B60K 6/365 |
| DE | 102018220603 A1 | * | 4/2020 | B60K 35/00 |
| GB | 2564195 A | * | 1/2019 | B60H 1/00657 |
| JP | 2010064521 A | | 3/2010 | |
| JP | 5228724 B2 | | 7/2013 | |

* cited by examiner

FIG. 12

| TRANSITION | CHANGE | CONDITIONS |
|---|---|---|
| 1 | 0 → 2 | [AUTHENTICATION = TRUE & DRV. DOOR = OPEN & SEAT OCCUPIED = TRUE] & AUDIO (PREVIOUS) = ON <OR> AUDIO ONLY REQ = TRUE |
| 2 | 0 → 1 | [AUTHENTICATION = TRUE & DRV. DOOR = OPEN & SEAT = OCCUPIED & BRK PRESS = TRUE] & AUDIO (PREVIOUS) = OFF <OR> AUDIO ONLY REQ = FALSE |
| 3 | 1 → 0 | (DRIVER EXIT & VEHICLE PARKED) <OR> (PWR OVERRIDE SW = TRUE > 3 SECONDS) |
| 4 | 1 → 3 | AUDIO ON REQ = TRUE & BATTERY SOC != LOW |
| 5 | 1 → 2 | VEHICLE PARKED = TRUE & AUDIO ONLY REQ = TRUE |
| 6 | 3 → 1 | AUDIO ON REQ = FALSE <OR> BATTERY SOC = LOW |
| 7 | 3 → 2 | VEHICLE PARKED & AUDIO ONLY REQ = TRUE |
| 8 | 3 → 0 | (DRIVER EXIT & VEHICLE PARKED) <OR> (PWR OVERRIDE SW = TRUE > 3 SECONDS) |
| 9 | 2 → 3 | SEAT OCCUPIED = TRUE & BRK PRESS = TRUE |
| 10 | 2 → 0 | (DRIVER EXIT & VEHICLE PARKED) <OR> (PWR OVERRIDE SW = TRUE > 3 SECONDS) <OR> BATTERY SOC = LOW |

KEYLESS DUAL POWER SYSTEM CONTROL FOR ELECTRIC MOTOR VEHICLES

BACKGROUND

The present disclosure relates generally to power system control techniques for vehicles, and more specifically to a keyless dual power system control method and system for an electric motor vehicle.

Modern vehicles are increasingly moving away from requiring traditional keys for entry and/or to start or "power on" the powertrain of the vehicle. Replacing these traditional keys are a variety of wireless authentication devices and techniques that allow the vehicle to be powered on when the wireless authentication device is in proximity to the vehicle.

Additionally, changes to conventional powertrain systems, such as the move to electric motors replacing internal combustion engines, eliminate the need for a vehicle operator to physically turn a traditional key in order to start the vehicle.

There is a need in the art for an improved method and system for keyless dual power system control for vehicles.

SUMMARY

In one aspect, a method for keyless dual power system control for an electric motor vehicle is provided. The electric motor vehicle includes a powertrain electronic control unit (ECU) and an infotainment system that are independently powered. The method includes receiving a user authentication from a wireless device to authenticate a user, receiving a driver's door status from a door sensor, receiving a driver presence signal from a seat pressure sensor, and determining whether the driver's door status from the door sensor indicates the driver's door is in an open status. The method also includes controlling the infotainment system to be in an on status and controlling the powertrain ECU to be in an off status upon receiving the user authentication, determining the driver's door is in the open status, and receiving the driver presence signal.

In another aspect, a system for controlling a keyless dual power system of an electric motor vehicle is provided. The system includes a powertrain electronic control unit (ECU) configured to control at least an electric motor of the electric motor vehicle and an infotainment system that is independently powered from the powertrain ECU. The system also includes at least one door sensor associated with a driver's door of the electric motor vehicle, a seat pressure sensor configured to detect a driver's presence in a driver's seat of the electric motor vehicle, and a brake pedal switch associated with a brake pedal of the electric motor vehicle. The brake pedal switch is configured to detect when the brake pedal has been pressed. The system further includes a power control module including at least one processor that receives a user authentication from a wireless device to authenticate a user to the electric motor vehicle, receives a driver's door status from the at least one door sensor, receives a driver presence signal from the seat pressure sensor, and determines whether the driver's door status from the at least one door sensor indicates the driver's door is in an open status. Upon receiving the user authentication, determining the driver's door is in the open status, and receiving the driver presence signal, the power control module controls the infotainment system to be in an on status and controls the powertrain ECU to be in an off status.

In another aspect, an electric motor vehicle is provided. The electric motor vehicle includes an electric motor, a powertrain electronic control unit (ECU) configured to control at least the electric motor, and a battery associated with the powertrain ECU configured to provide power to at least the electric motor. The electric motor vehicle also includes an infotainment system that is independently powered from the powertrain ECU and a keyless dual power control system. The keyless dual power control system includes at least one door sensor associated with a driver's door of the electric motor vehicle, a seat pressure sensor configured to detect a driver's presence in a driver's seat of the electric motor vehicle, and a brake pedal switch associated with a brake pedal of the electric motor vehicle. The brake pedal switch configured to detect when the brake pedal has been pressed. The keyless dual power control system also includes a power control module having at least one processor that receives a user authentication from a wireless device to authenticate a user to the electric motor vehicle, receives a driver's door status from the at least one door sensor, receives a driver presence signal from the seat pressure sensor, and determines whether the driver's door status from the at least one door sensor indicates the driver's door is in an open status. Upon receiving the user authentication, determining the driver's door is in the open status, and receiving the driver presence signal, the power control module controls the infotainment system to be in an on status and controls the powertrain ECU to be in an off status.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments can be better understood with reference to the following drawings and description. The components in the figures are not necessarily to scale. Moreover, in the figures, like reference numerals designate corresponding parts throughout the different views.

FIG. 12 is a table of the exemplary conditions from the plurality of inputs from the electric motor vehicle associated with the different transitions between each status shown in the state diagram of FIG. 10 implemented by the keyless dual power control system.

DETAILED DESCRIPTION

A method and system for providing keyless dual power control for an electric motor vehicle are broadly disclosed. According to the techniques described herein, the keyless dual power control system and method authenticates a user and allows them to use other vehicle inputs to indicate to the vehicle the user's intention, and in response, the vehicle selectively controls the power for the main vehicle systems that are used for powertrain and/or entertainment functions. Generally, embodiments of this disclosure are variously shown in FIGS. 1-12, which are described in detail below.

A variety of terms are used in this disclosure. These terms are used with reference to the following definitions and descriptions, as well as the knowledge of a person having ordinary skill in the art of electric motor vehicles.

Figure 1:
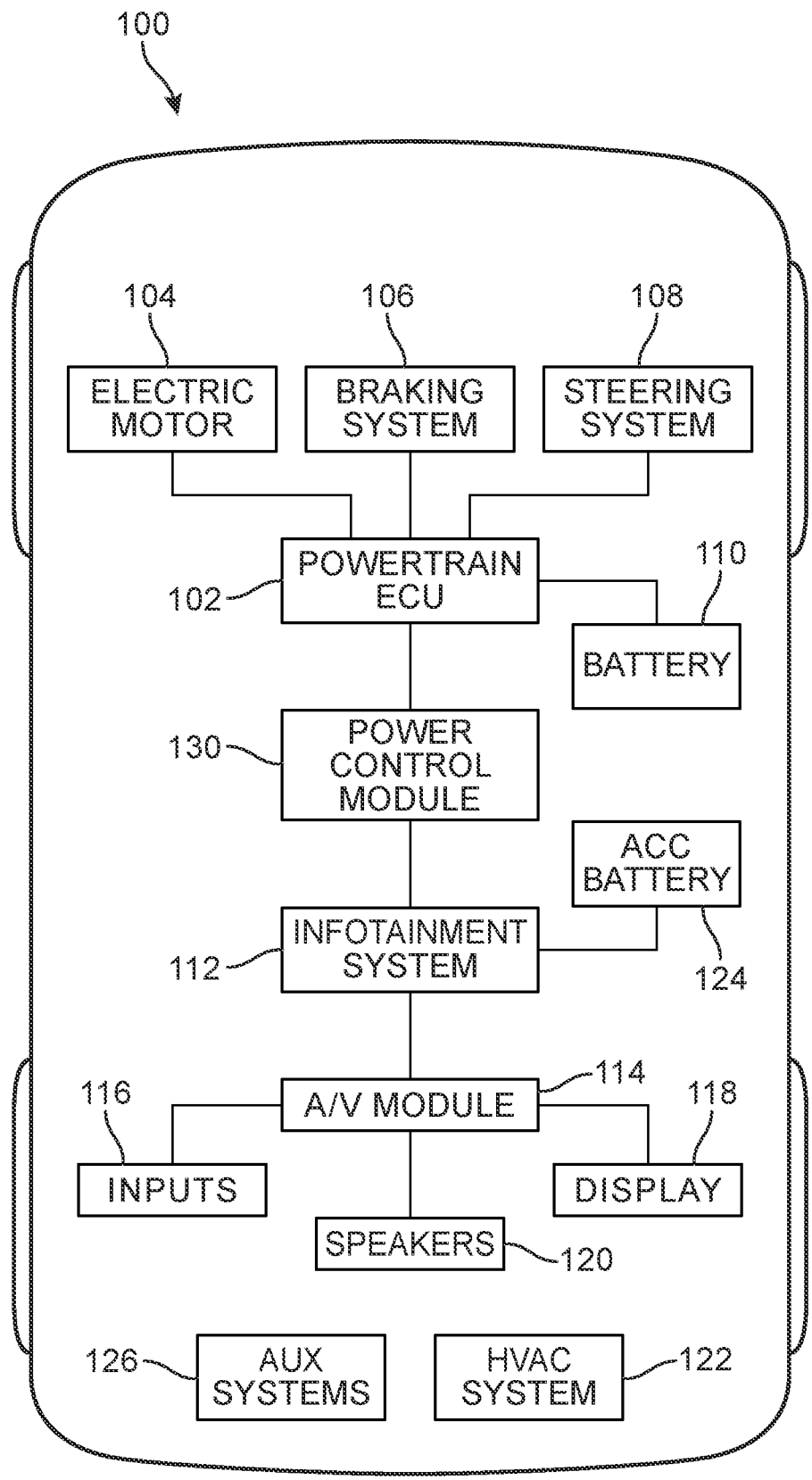
FIG. 1 is a block diagram of an example embodiment of an electric motor vehicle including a keyless dual power control system.

FIG. 1 shows a schematic block diagram of an electric motor vehicle 100. Electric motor vehicle 100 broadly includes a number of components, including, but not limited to a powertrain electronic control unit (ECU) 102, an electric motor 104, a braking system 106, a steering system 108, and a battery 110. Electric motor vehicle 100 may generally be any type of electric motor vehicle.

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft. An electric motor vehicle is a motor vehicle that uses electricity to power a motor that provides propulsion. Electric motor vehicles may exclusively use electricity stored in a battery to power movement of the vehicle, or may use electricity in combination with other propulsion mechanisms, such as in a hybrid vehicle.

In an example embodiment, electric motor vehicle 100 may be provided with propulsive force from electric motor 104, which may be configured to move the front wheels, the rear wheels, or both front and rear wheels of electric motor vehicle 100. In some embodiments, electric motor 104 may be supplied electricity from a power source, including battery 110 in this embodiment. Braking system 106 is configured to provide a stopping force for electric motor vehicle 100 and, in some embodiments, may include regenerative braking mechanisms and techniques. Steering system 108 is configured to allow an operator of electric motor vehicle 100 to control the direction of electric motor vehicle 100, for example, by turning the wheels. Steering system 108 may also be configured to receive control instructions from an autonomous vehicle control system that controls the direction of electric motor vehicle 100 without steering input from an occupant of the vehicle.

In an example embodiment, powertrain ECU 102 is configured to control components of electric motor vehicle 100 associated with the powertrain (e.g., components used to provide, control, and stop movement of electric motor vehicle 100), including but not limited to electric motor 104, braking system 106, steering system 108, and/or battery 110.

In an example embodiment, electric motor vehicle 100 may include additional components that are not part of the powertrain. In some embodiments, electric motor vehicle 100 may include an infotainment system 112 that includes at least an audio/visual (A/V) module 114 that is configured to receive various inputs 116 from different sources and outputs audio through speakers 120 and video through display 118. In some embodiments, inputs 116 may include AM/FM radio, satellite radio, GPS, internet, cameras or sensors on board the vehicle, as well as other types of auxiliary inputs, such as short-range wireless connections, USB, audio jacks, CD/DVD or other physical media readers or players, and/or other forms of media that may be output to display 118 and/or speakers 120 through A/V module 114.

In an example embodiment, infotainment system 112 and associated components may be provided electrical power from an accessory battery 124. Accessory battery 124 is a separate battery from battery 110 that is used to provide electrical power to electric motor 104. In an example embodiment, accessory battery 124 is configured to provide a significantly lower voltage than battery 110, which is configured for providing high voltages. For example, in some cases, high voltage used in electric vehicles (e.g., electric motor vehicle 100) may be at least above 60V DC and up to 800V. In contrast, accessory battery 124 may be configured to provide 12V DC. In some cases, battery 110 may be used to charge accessory battery 124, for example, using a voltage converter or other mechanism to convert the high voltage from battery 110 to a lower voltage that may be used to charge accessory battery 124.

In some embodiments, electric motor vehicle 100 may include at least two different electrical systems, including a high voltage electrical system connected to at least electric motor 104 and battery 110 and an accessory electrical system connected to other systems of electric motor vehicle 100 that are configured to operate using a lower voltage than the high voltage electrical system associated with electric motor 104 and battery 110. In this embodiment, the accessory electrical system is connected to at least infotainment system 112, A/V module 114, inputs 116, display 118, speakers 120, HVAC system 122, and accessory battery 124. In an example embodiment, these two different electrical systems are independent and/or electrically isolated from each other. For example, many motor vehicles use a lower voltage (e.g., 12 volt) electrical system to provide electricity to various components, such as sensors, headlights, entertainment systems, etc.

It should be understood that electric motor vehicle 100 may include other or additional components than those shown in FIG. 1 that may be associated with or controlled by powertrain ECU, infotainment system 112, or other systems of electric motor vehicle 100. For example, as shown in this embodiment, electric motor vehicle 100 may further include heating ventilation and cooling (HVAC) system 122 that may be controlled through infotainment system 112. That is, in some cases, HVAC system 122 may be controlled or operated through infotainment system 112 so that heating, cooling, and other ventilation functions may be provided to occupants of electric motor vehicle 100 without requiring the powertrain components to be powered on via powertrain ECU 102.

In some embodiments, electric motor vehicle 100 may also include one or more components associated with auxiliary systems 126. For example, auxiliary systems 126 may include components of electric motor vehicle 100 that are configured to draw power irrespective of the power output status of powertrain ECU 102 and/or infotainment system 112. In an example embodiment, auxiliary systems 126 may include user authentication systems, exterior and/or interior lights, door locks, and other sensors or systems that may be configured to be "always on" or "always active" on electric motor vehicle 100.

In an example embodiment, the keyless dual power control system and method described herein may be provided by a power control module 130 of electric motor vehicle 100. In some embodiments, power control module 130 may include at least one processor that detects various inputs from sensors associated with electric motor vehicle 100 to determine an appropriate power output status for each of powertrain ECU 102 and infotainment system 112. That is, as will be described in more detail below, power control module 130 may separately and independently power on components associated with powertrain ECU 102 and components associated with infotainment system 112 based on various scenarios detected using the sensors associated with electric motor vehicle 100.

Figure 2:
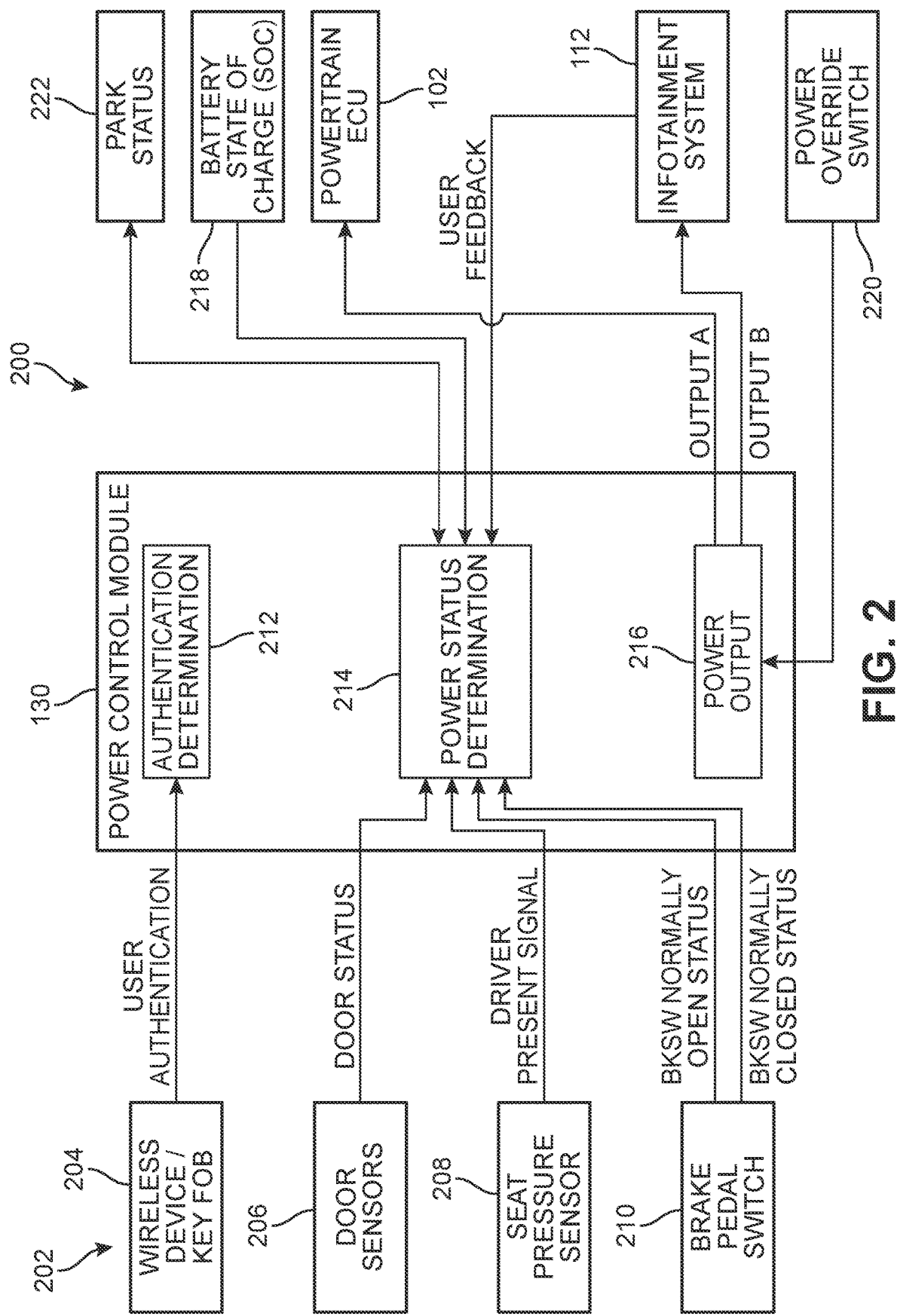
FIG. 2 a block diagram of an example embodiment of a keyless dual power control system for an electric motor vehicle.

Referring now to FIG. 2, a block diagram of an example embodiment of a keyless dual power control system 200 is shown. In some embodiments, functions of keyless dual power control system 200 may be implemented by power control module 130. In an example embodiment, keyless dual power control system 200 includes a plurality of sensors 202 associated with electric motor vehicle 100 that provide information and/or inputs to power control module 130 of keyless dual power control system 200.

In one embodiment, plurality of sensors 202 includes a wireless device 204, such as a key fob or application running on a mobile phone, that provides user authentication information to power control module 130. In this embodiment, wireless device 204 authenticates the user using an authentication determination operation 212 performed by power control module 130. In some embodiments, authentication determination operation 212 implemented by power control module 130 may compare saved or stored user authentication credentials to the user authentication information provided by wireless device 204 to authenticate a user as an approved user of electric motor vehicle 100. That is, wireless device 204 functions as a security verification mechanism that replaces a traditional key, but performs such security verification using wireless technology.

Plurality of sensors 202 also includes one or more door sensors 206, a seat pressure sensor 208, and a brake pedal switch 210. Door sensors 206 may include at least a door sensor associated with a driver's door. Although referred to herein as the "driver's door", it is understood that a fully autonomous vehicle may not include a door and/or seat designated for a driver since the vehicle does not require a driver. Therefore, in embodiments where keyless dual power control system 200 is included in an autonomous vehicle, the "driver's door" should be considered one of a plurality of doors or possibly a single door in a vehicle that includes only one door. In some embodiments, door sensors 206 may include door sensors associated with other doors of the vehicle (e.g., electric motor vehicle 100), including but not limited to a passenger door, a driver side rear door, and/or a passenger side rear door. In some cases, door sensors 206 may further include sensors associated with a hatch or trunk. Door sensors 206 are configured to provide a signal to power control module 130 that indicates a status for the door associated with the given sensor (i.e., whether the door is open or closed). In accordance with the techniques described herein, door sensors 206 provide at least a signal associated with the status of the driver's door to power control module 130.

In an example embodiment, seat pressure sensor 208 is associated with at least a driver's seat and is configured to provide a signal indicating the presence of the driver to power control module 130. In some embodiments, seat pressure sensor 208 may be a weight sensor that detects the presence of the driver based on detecting a weight over a predetermined threshold or a contact sensor that includes a switch that is closed when a weight over a predetermined amount is applied to the contact sensor to indicate that a driver is sitting on the driver's seat of electric motor vehicle 100. Seat pressure sensor 208 may also or alternatively include a seat occupancy sensor that uses one or more occupancy sensing technologies, including but not limited to passive infrared, microwave, ultrasonic, and/or video image processing, to detect the presence of the driver in the driver's seat of electric motor vehicle 100. Upon detecting the presence of the driver, seat pressure sensor 208 sends a driver present signal to power control module 130 for use in determining an appropriate power status determination, as will be described below.

Brake pedal switch 210 is configured to provide a signal to power control module 130 indicating when a driver has pressed on the brake pedal of electric motor vehicle 100. In some embodiments, brake pedal switch 210 may be a contact sensor or a force sensor that is configured to detect when a foot of a driver has pressed down on the brake pedal. In some cases, brake pedal switch 210 may include redundant sensors including a first sensor having a switch that is normally open and which sends a signal when the switch is closed (i.e., upon pressing of the brake pedal by the driver) and a second sensor having a switch that is normally closed and which sends a signal when the switched is open (i.e., upon pressing of the brake pedal by the driver). With this redundant configuration, brake pedal switch 210 is configured to provide an accurate status of the state of the brake pedal to correctly indicate when the brake pedal is pressed on by a driver of electric motor vehicle 100.

In an example embodiment, power control module 130 receives the information and/or inputs from door sensors 206 (e.g., driver door status signal), seat pressure sensor 208 (e.g., driver present signal), and brake pedal sensor 210 (e.g., brake pedal pressed signal or signals) and uses this information and inputs to determine a power status output at a power status determination operation 214. That is, based on the received information and/or inputs, power control module 130 implements power status determination operation 214 to determine an appropriate power output 216 for each of powertrain ECU 102 and infotainment system 112, as will be described in more detail below.

In some embodiments, information from a battery state of charge (SOC) sensor 218, user feedback from infotainment system 112, and/or a signal from a power override switch 220 may also be provided to power control module 130 for use in power status determination operation 214. Battery SOC sensor 218 is configured to measure and determine a current state of charge of battery 110 of electric motor vehicle 100. In some cases, certain functionality of electric motor vehicle 100 may be limited or prohibited when the state of charge of battery 110 falls below a predetermined threshold or reserve charge value.

In some embodiments, user feedback from infotainment system 112 may include one or more selections made by a user for a specific power output status for infotainment system 112. For example, user feedback from infotainment system 112 may be an input indicating a selected power on status, a selected power off status, or a power on status with a predetermined time delay upon exit. User feedback from infotainment system 112 provided to power control module 130 allows a user to manually select the desired power output status of infotainment system 112 (e.g., on, off, or time delay).

In an example embodiment, electric motor vehicle 100 may be provided with override switch 220 that allows a user to manually control both powertrain ECU 102 and infotainment system 112 to a power off status. That is, override switch 220 sends a signal to power control module 130 to instruct keyless dual power control system 200 to turn off both powertrain ECU 102 and infotainment system 112. In one embodiment, override switch 220 may be located within a passenger compartment of electric motor vehicle 100 so that it is within reach of the driver of electric motor vehicle 100 when the driver is in the driver's seat.

In an example embodiment, electric motor vehicle 100 may also include a park status sensor 222. Park status sensor 222 is configured to send a signal to power control module 130 that indicates that electric motor vehicle 100 is in a parked configuration (i.e., is not moving or ready to move). For example, park status sensor 222 may be a sensor associated with electric motor 104 and/or a sensor associated with an electric parking brake or other mechanism that prevents electric motor vehicle 100 from moving without input from an operator, such as a user or an autonomous driving system. Using the signal from park status sensor 222, power control module 130 may determine whether or not electric motor vehicle 100 is parked or not. In the case no signal is received from park status sensor 222, power control module 130 may determine that electric motor vehicle 100 is not parked.

Based on the power status determination operation 214, power control module 130 of keyless dual power control system 200 determines the appropriate power output 216. In this embodiment, power output 216 includes an output A that controls the power on/off status for powertrain ECU and an output B that controls the power on/off status of infotainment system 112. As will be described below, power output 216 may take one of four different combinations of power on/power off statuses for powertrain ECU 102 and infotainment system 112 (described with reference to method 300 shown in FIG. 3).

In some cases the signals and/or inputs from plurality of sensors 202 and/or other components of keyless dual power control system 200, including battery SOC signal from battery SOC sensor 218 and/or power override switch 220, may be hardwired into keyless dual power control system 200. In other cases, the signals and/or inputs may be transmitted using various communication protocol interfaces within electric motor vehicle 100, including, but not limited to a Controller Area Network (CAN) protocol interface and/or a Local Interconnect Network (LIN) protocol interface, using appropriate buses. In still other cases, a combination of hardwired and communication protocol interfaces may be used.

In some embodiments, one or more functions of authentication determination operation 212, power status determination 214, and/or battery SOC sensor 218 may be performed (partially or fully) by a separate electronic control unit (ECU) and the results may be provided or transmitted to power control module 130 for use in implementing the method of keyless dual power control described herein.

Figure 3:
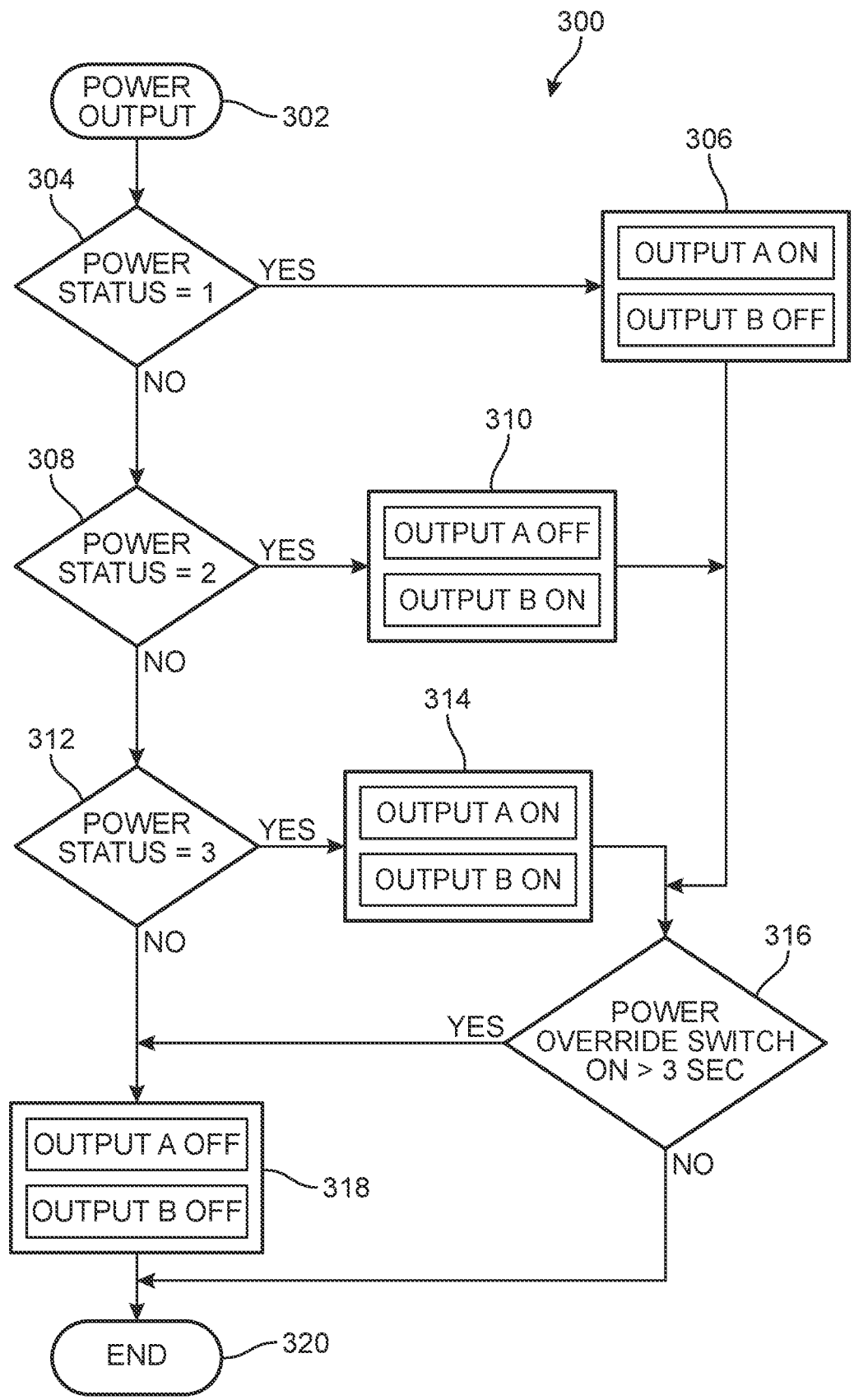
FIG. 3 is a flowchart of an example embodiment of a method for generating a power output status for a keyless dual power control system of an electric motor vehicle.

FIG. 3 illustrates a flowchart of an example embodiment of a method 300 for generating a power output status for keyless dual power control system 200 of electric motor vehicle 100. In some embodiments, method 300 may be implemented by power control module 130 of keyless dual power control system 200. In an example embodiment, method 300 may be implemented in response to power status determination 214 performed by power control module 130 and the resulting power output status may be provided as power output 216, as shown in FIG. 2.

In this embodiment, method 300 begins with an operation 302 where a power output status is initiated. For example, operation 302 may be initiated in response to power status determination 214. Next, method 300 proceeds to an operation 304, where a first power output status is determined. At operation 304, when the first power output status (e.g., power status=1) is determined, method 300 proceeds to a first power output 306. First power output 306 is associated with output A (e.g., to powertrain ECU 102) in an on status and output B (e.g., to infotainment system 112) in an off status.

When the first power output status is not determined at operation 304, method 300 proceeds to an operation 308, where a second power output status is determined. At operation 308, when the second power output status (e.g., power status=2) is determined, method 300 proceeds to a second power output 310. Second power output 310 is associated with output A (e.g., to powertrain ECU 102) in an off status and output B (e.g., to infotainment system 112) in an on status.

When the second power output status is not determined at operation 308, method 300 proceeds to an operation 312, where a third power output status is determined. At operation 312, when the third power output status (e.g., power status=3) is determined, method 300 proceeds to a third power output 314. Third power output 314 is associated with output A (e.g., to powertrain ECU 102) in an on status and output B (e.g., to infotainment system 112) in an on status.

Additionally, upon method 300 determining any of first power output 306, second power output 310, and/or third power output 314, method 300 may proceed to an operation 316. At operation 316, whether or not a power override switch has been pressed for a predetermined amount of time (e.g., 3 seconds) is checked. For example, a user may press and hold override switch 220 for the predetermined amount of time to manually turn off both powertrain ECU 102 and infotainment system 112 (i.e., both output A and output B in an off status). When operation 316 determines that the power override switch has not been pressed for the predetermined amount of time, method 300 proceeds to an end 320.

Upon determining at operation 316 that the power override switch has been pressed for the predetermined amount of time, or, when the third power output status is not determined at operation 312, method 300 proceeds to a fourth power output status 318. Fourth power output 318 is associated with output A (e.g., to powertrain ECU 102) in an off status and output B (e.g., to infotainment system 112) in an off status. In some embodiments, fourth power output 318 may be a default power output status and/or may be referred to a zero power output status (e.g., power output=0) to reflect that both output A and output B are in an off status (i.e., both powertrain ECU 102 and infotainment system 112 are turned off).

Figure 4:
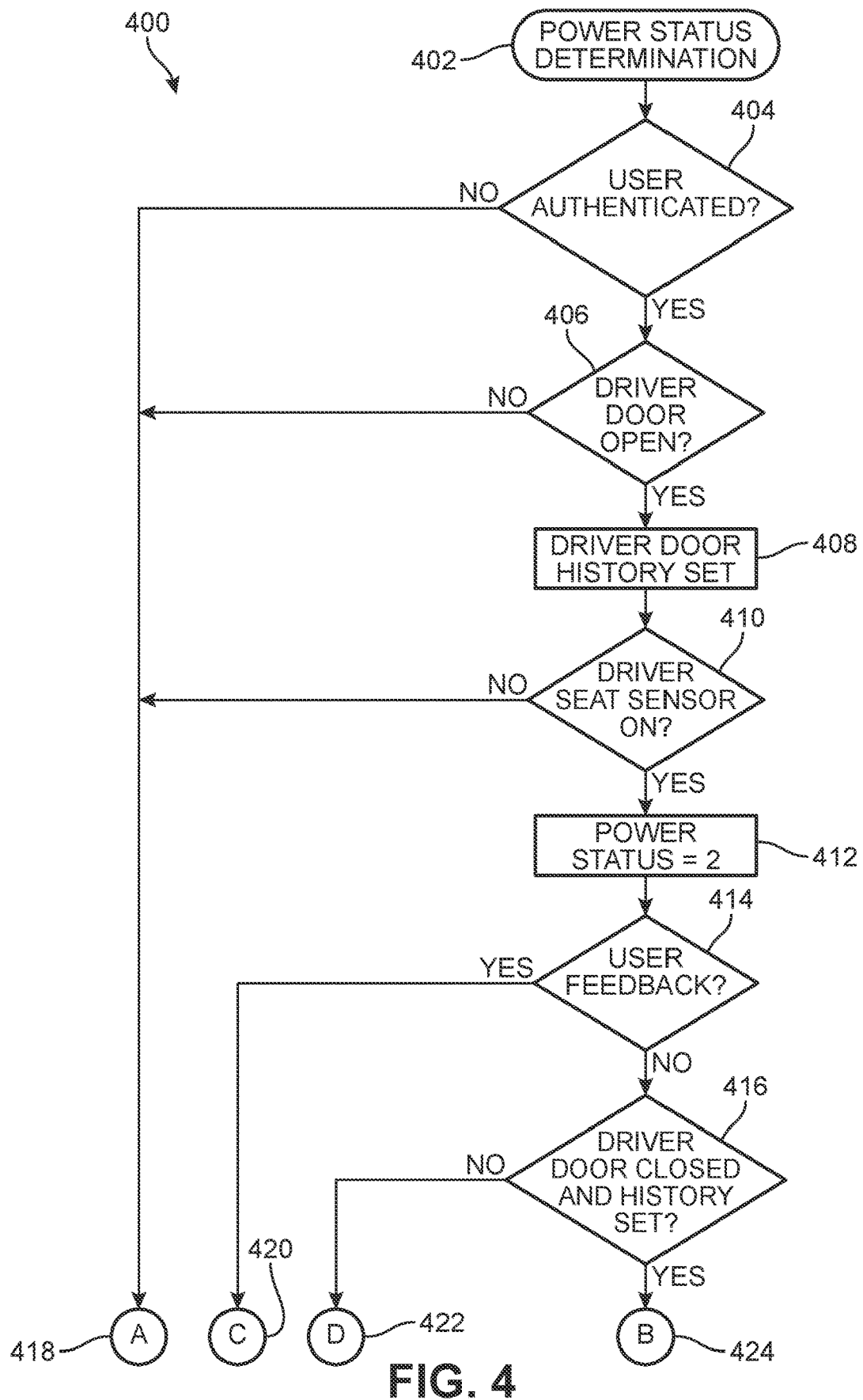
FIG. 4 is a flowchart of an example embodiment of a method for determining a power output status for a keyless dual power control system based on sensor inputs from an electric motor vehicle.

Referring now to FIG. 4, a flowchart of an example embodiment of a method 400 for determining a power output status for keyless dual power control system 200 based on sensor inputs from electric vehicle 100 is illustrated. In some embodiments, method 400 may be implemented by power control module 130 of keyless dual power control system 200. In an example embodiment, method 400 may be implemented as part of power status determination 214 performed by power control module 130 and the resulting power output status may be determined according to method 300, described above, and provided as power output 216, as shown in FIG. 2.

In an example embodiment, method 400 may begin at an operation 402 where power status determination is initiated. For example, operation 402 may be initiated as part of power status determination 214 performed by power control module 130. At an operation 404, whether or not a user is authenticated is determined. As described in reference to FIG. 2, authentication determination operation 212 implemented by power control module 130 may compare saved or stored user authentication credentials to the user authentication information provided by wireless device 204 to authenticate a user as an approved user of electric motor vehicle 100. At operation 404, the result of authentication determination operation 212 is checked. Upon determining that the user is not authorized (i.e., the result of operation 404 is NO), then method 400 proceeds to an operation A 418 (described below with reference to FIG. 5). Upon determining that the user is authorized (i.e., the result of operation 404 is YES), then method 400 proceeds to an operation 406.

At operation 406, whether or not a driver door has been opened is determined. For example, the status of the driver's door may be checked at operation 406 using the input from door sensors 206, described in reference to FIG. 2. The input from door sensors 206 may indicate that the door has been changed to an open status from a closed status to detect that the driver's door has been opened. In some cases, the driver's door may be closed again after the user enters electric motor vehicle 100. The driver's door history may be set to indicate detection of one or more closed-opened-closed cycle that is associated with a user entering or exiting electric motor vehicle 100. Upon determining at operation 406 that the driver's door has not been opened (i.e., the result of operation 406 is NO), then method 400 again proceeds to operation A 418. Upon determining at operation 406 that the driver's door has been opened (i.e., the result of operation 406 is YES), then method 400 proceeds to an operation 408. At operation 408 a driver's door history is set to indicate that the driver's door status was changed from a closed state to an opened state (e.g., based on the input from door sensors 206) and method 400 proceeds to an operation 410.

At operation 410, whether or not a driver's seat sensor is on is determined. That is, at operation 410, the presence of the driver in the driver's seat is determined using the signal from seat pressure sensor 208 and/or other occupancy sensors in electric motor vehicle 100 to determine whether the driver is sitting in the driver's seat. Upon determining at operation 410 that the driver is not present in the driver's seat (i.e., the result of operation 410 is NO), then method 400 again proceeds to operation A 418. Upon determining at operation 410 that the driver is present in the driver's seat (i.e., the result of operation 410 is YES), then method 400 proceeds to an operation 412.

At operation 412, the second power status (e.g., power status=2) is determined based on keyless dual power control system 200 detecting that a user has been authenticated (i.e., operation 404), the driver's door has been opened (i.e., operation 406), and the driver is sitting in the driver's seat (i.e., operation 410). In this scenario, keyless dual power control system 200 may automatically place electric motor vehicle 100 in second power output 310 associated with output A (e.g., to powertrain ECU 102) in an off status and output B (e.g., to infotainment system 112) in an on status. With this arrangement, when an authenticated user opens a door of electric motor vehicle 100 and sits on the driver's seat, infotainment system 112 will automatically be provided with power (e.g., in an on status).

Next, method 400 proceeds to an operation 414. At operation 414, whether or not a user has provided any feedback through infotainment system 112 is determined. For example, as described above, in some embodiments a user may provide user feedback through infotainment system 112 to manually select the desired power output status of infotainment system 112 (e.g., on, off, or time delay). Upon determining at operation 414 that the user has provided feedback (i.e., the result of operation 414 is YES), then method 400 proceeds to an operation C 420. Upon determining at operation 414 that the user has not provided feedback (i.e., the result of operation 414 is NO), then method 400 proceeds to an operation 416.

At operation 416, whether or not a driver's door is closed and the door change history is set (e.g., at operation 408) to indicate that the door was closed from a previously open state is determined. For example, the status of the driver's door may be determined based on the input from door sensors 206, as described above in reference to FIG. 2. Upon determining at operation 416 that the driver's door is not closed and/or there was no door change history set (i.e., the result of operation 416 is NO), then method 400 proceeds to an operation D 422. Upon determining at operation 416 that the driver's door is closed and there was a door change history set (i.e., the result of operation 416 is YES), then method 400 proceeds to an operation B 424.

Operation 416 covers a scenario where the driver exits electric motor vehicle 100. In this exit scenario, electric motor vehicle 100 may be in first power output 306 (power status=1), second power output 310 (power status=2), or third power output 314 (power status=3). When the driver opens the door, gets up from the driver's seat, and closes the door, door sensors 206 sense the change in the driver's door status and seat pressure sensor 208 or other seat occupancy sensor detects no driver is present on the driver's seat. Accordingly, operation 416 will result in fourth power output 318 (i.e., power status=0) associated with output A (e.g., to powertrain ECU 102) in an off status and output B (e.g., to infotainment system 112) in an off status.

Figure 5:
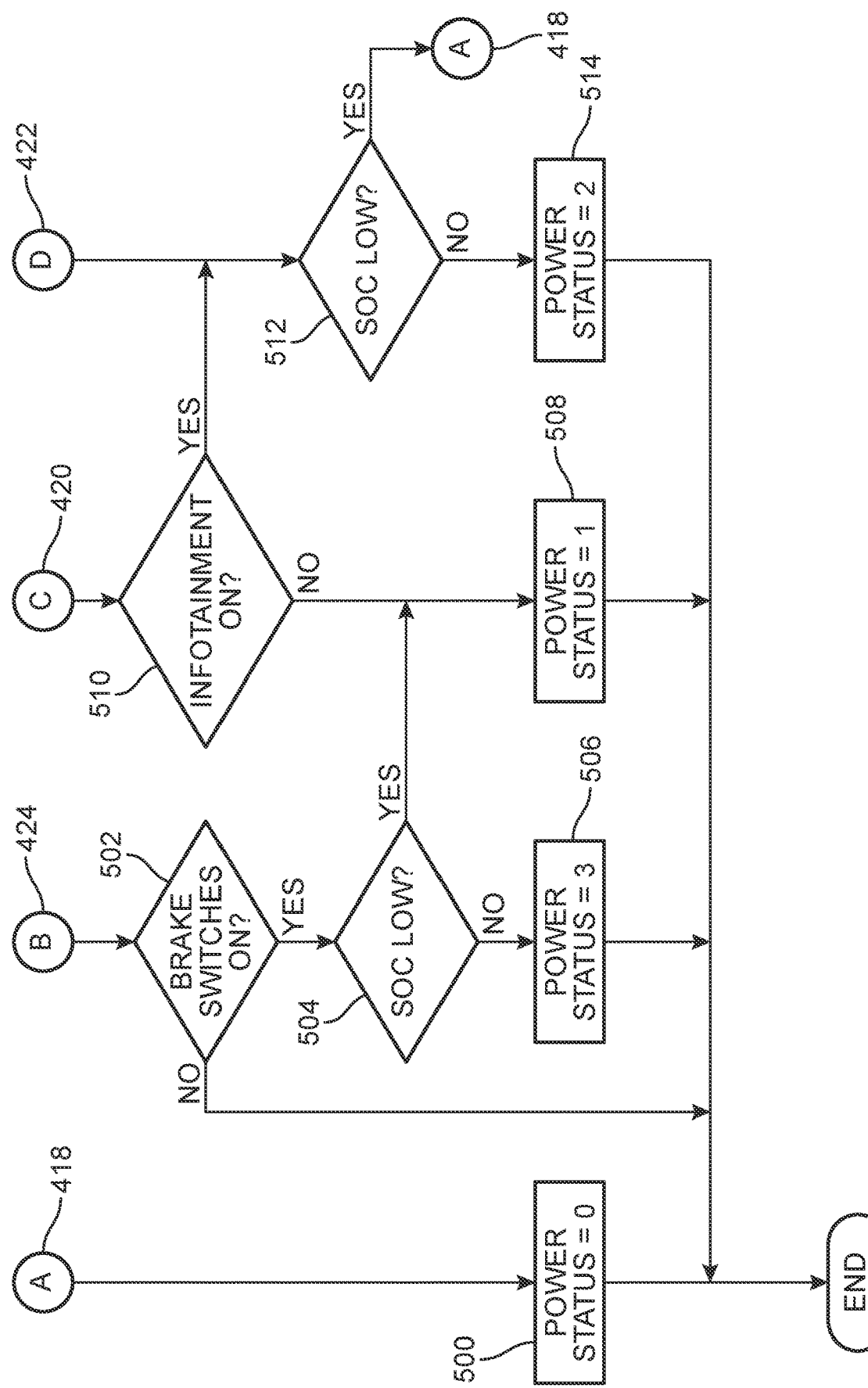
FIG. 5 is a flowchart of an example embodiment of available power output status operations for an electric motor vehicle based on the determination from the method of FIG. 4.

Referring now to FIG. 5, a flowchart of an example embodiment of available power output status operations A, B, C, D for electric motor vehicle 100 based on the determination from the method of FIG. 4 is shown. In this embodiment, the responses to the power status determination of method 400 to generate a corresponding power output for electric motor vehicle 100 are shown. In an example embodiment, operation A 418 results in a response 500 where the power output is determined to be fourth power output 318 (i.e., power status=0) associated with output A (e.g., to powertrain ECU 102) in an off status and output B (e.g., to infotainment system 112) in an off status.

As shown in FIG. 5, operation B 424 from method 400 proceeds to an operation 502 where whether or not the brake switch is on is determined, indicating that the driver has pressed on the brake pedal. For example, as described above, operation 502 includes receiving a signal from brake pedal switch 210 indicating when a foot of a driver has pressed down on the brake pedal. Upon determining at operation 502 that the brake switch is not on (i.e., the result of operation 502 is NO) to indicate that the driver has not pressed the brake pedal, then operation B 424 ends. In this case, the power output remains second power output 310 associated with output A (e.g., to powertrain ECU 102) in an off status and output B (e.g., to infotainment system 112) in an on status, as determined at operation 412 of method 400.

Upon determining at operation 502 that the brake switch is on (i.e., the result of operation 502 is YES) to indicate that the driver has pressed the brake pedal, then operation B 424 proceeds to an operation 504. At operation 504, whether the state of charge (SOC) is low is determined. At operation 504, a low SOC may be determined based on comparing the SOC of battery 110 from battery SOC sensor 218 to a predetermined threshold. In one case, the predetermined threshold may be approximately 5% of the total battery charge remaining. In another case, the predetermined threshold may be approximately 10% of the total battery charge remaining. When the SOC of battery 110 is not determined to be low (i.e., at or above the predetermined threshold) at operation 504 (i.e., the result of operation 504 is NO), then operation B 424 proceeds to a response 506 where the power output is determined to be third power output 314 (i.e., power status=3) associated with output A (e.g., to powertrain ECU 102) in an on status and output B (e.g., to infotainment system 112) in an on status.

When the SOC of battery 110 is determined to be low (i.e., below the predetermined threshold) at operation 504 (i.e., the result of operation 504 is YES), then operation B 424 proceeds to a response 508 where the power output is determined to be first power output 306 (i.e., power status=1) associated with output A (e.g., to powertrain ECU 102) in an on status and output B (e.g., to infotainment system 112) in an off status. With this arrangement, additional drain on battery 110, which has a low battery charge, may be reduced by causing infotainment system 112 to be in an off status.

As shown in FIG. 5, operation C 420 from method 400 proceeds to an operation 510 where whether or not infotainment system 112 is on or not is determined. For example, as described above, the driver may provide user feedback through infotainment system 112 to manually select the desired power output status of infotainment system 112 (e.g., on, off, or time delay). Upon determining at operation 510 that infotainment system 112 is not on (i.e., the result of operation 510 is NO), then operation C 420 proceeds to response 508 where the power output is determined to be first power output 306 (i.e., power status=1) associated with output A (e.g., to powertrain ECU 102) in an on status and output B (e.g., to infotainment system 112) in an off status.

Upon determining at operation 510 that infotainment system 112 is on (i.e., the result of operation 510 is YES), then operation C 420 proceeds to an operation 512 where whether the stage of charge (SOC) of battery 110 is low is determined. At operation 512, a low SOC may be determined in a similar manner as described with reference to operation 504. For example, the SOC of battery 110 from battery SOC sensor 218 may be compared to a predetermined threshold (e.g., approximately 5% or 10% of the total battery charge remaining). It should be understood that the predetermined threshold used for operation 512 and/or operation 504 may be higher or lower. When the SOC of battery 110 is not determined to be low (i.e., at or above the predetermined threshold) at operation 512 (i.e., the result of operation 512 is NO), then operation C 420 proceeds to a response 514 where the power output is determined to be second power output 310 (i.e., power status=2) associated with output A (e.g., to powertrain ECU 102) in an off status and output B (e.g., to infotainment system 112) in an on status.

When the SOC of battery 110 is determined to be low (i.e., below the predetermined threshold) at operation 512 (i.e., the result of operation 512 is YES), then operation C 420 proceeds to operation A 418 which results in response 500 where the power output is determined to be fourth power output 318 (i.e., power status=0) associated with output A (e.g., to powertrain ECU 102) in an off status and output B (e.g., to infotainment system 112) in an off status.

As shown in FIG. 5, operation D 422 from method 400 proceeds directly to operation 512, which follows the same results as described above with regard to the result of operation 512 from operation C 420. In other words, when the SOC of battery 110 is low at operation 512, operation D 422 to operation A 418 which results in response 500 where the power output is determined to be fourth power output 318 (i.e., power status=0) associated with output A (e.g., to powertrain ECU 102) in an off status and output B (e.g., to infotainment system 112) in an off status. When the SOC of battery 110 is not determined to be low at operation 512, then operation D 422 proceeds to response 514 where the power output is determined to be second power output 310 (i.e., power status=2) associated with output A (e.g., to powertrain ECU 102) in an off status and output B (e.g., to infotainment system 112) in an on status.

With this arrangement, when the SOC of battery 110 is determined to be low at operation 504 and/or operation 512, keyless dual power control system 200 may reduce or limit additional drain on battery 110 by causing infotainment system 112 to be in an off status.

Figure 6:
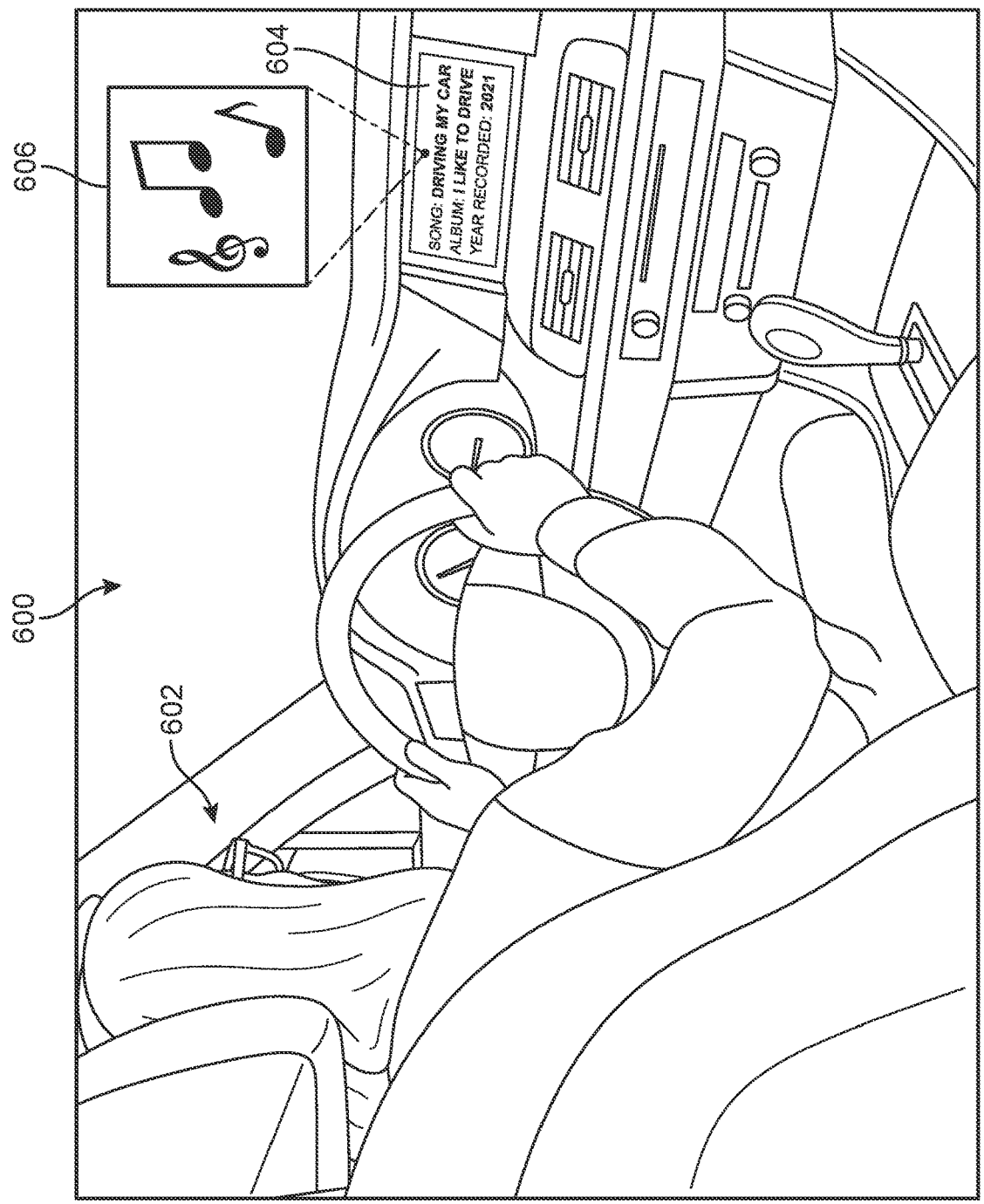
FIG. 6 is a representative view of an example embodiment of a first scenario for a power status output of an electric motor vehicle according to the method for controlling the keyless dual power control system.
Figure 6:
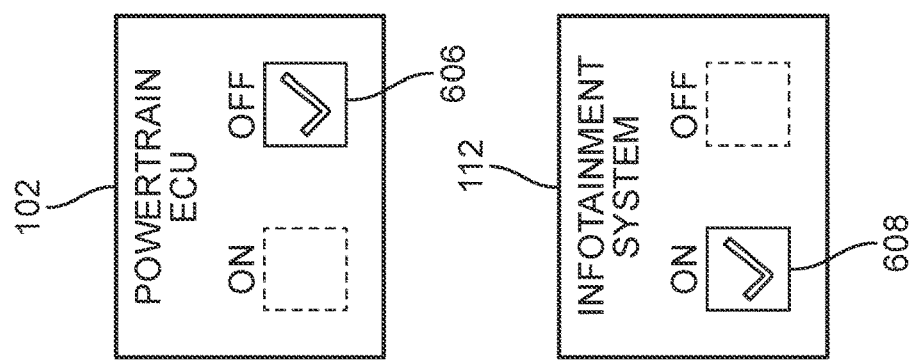

FIGS. 6-9 show various exemplary scenarios illustrating each of the different power status outputs described herein. Referring now to FIG. 6, an example embodiment of a first scenario 600 for a power status output of electric motor vehicle 100 according to the method for controlling the keyless dual power control system 200 is shown. In this embodiment, first scenario 600 depicts a driver 602 sitting in a driver's seat of electric motor vehicle 100 with the door closed. Accordingly, first scenario 600 illustrates a YES result for each of operation 404, operation 406, operation 408, and operation 410 of method 400, which causes keyless dual power control system 200 (e.g., as part of operation 412) to automatically place electric motor vehicle 100 in second power output 310 associated with output A (e.g., to powertrain ECU 102) in an off status 604 and output B (e.g., to infotainment system 112) in an on status 606. As shown in FIG. 6, in first scenario 600, a display screen 608 of infotainment system 112 is on and music 610 is playing through speakers. However, no power is provided to powertrain ECU so that electric motor vehicle 100 may not be driven in first scenario 600.

Figure 7:
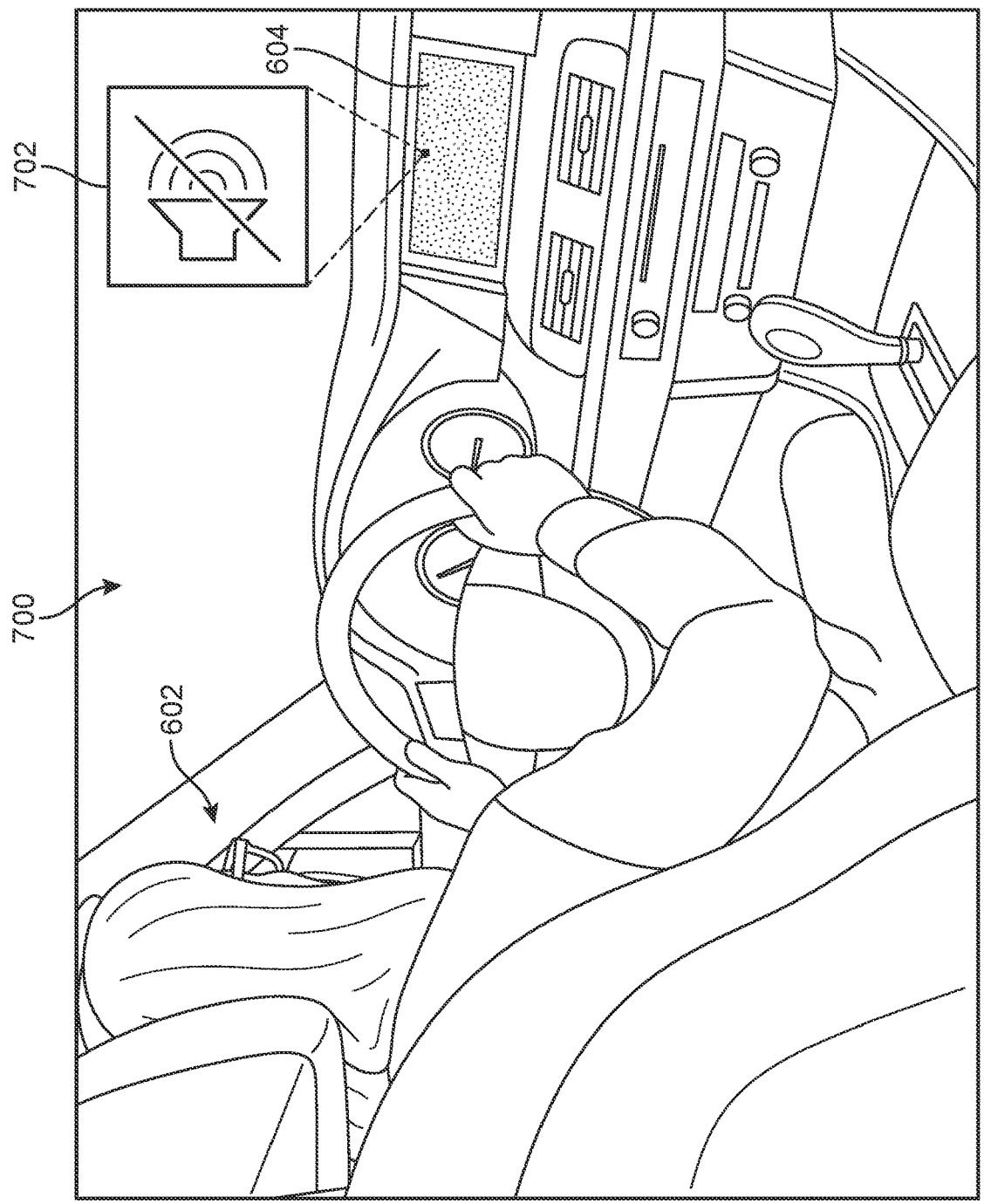
FIG. 7 is a representative view of an example embodiment of a second scenario for a power status output of an electric motor vehicle according to the method for controlling the keyless dual power control system.
Figure 7:
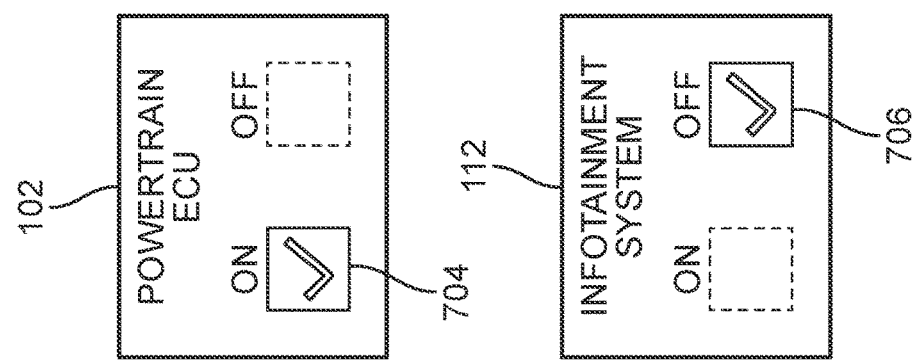

Referring now to FIG. 7, an example embodiment of a second scenario 700 for a power status output of electric motor vehicle 100 according to the method for controlling the keyless dual power control system 200 is shown. In this embodiment, second scenario 700 depicts driver 602 sitting in a driver's seat of electric motor vehicle 100 with the door closed. Accordingly, second scenario 700 also illustrates a YES result for each of operation 404, operation 406, operation 408, and operation 410 of method 400, similar to first scenario 600. However, in second scenario 700, driver 602 has provided user feedback through infotainment system 112 to manually turn off infotainment system 112, depicted with a blank display screen 608 and a mute icon 702 for the speakers. Accordingly, in contrast to first scenario 600, second scenario 700 illustrates user feedback at operation 414 of method 400 and operation 510 of operation C 420 which causes keyless dual power control system 200 to automatically place electric motor vehicle 100 in first power output 306 associated with output A (e.g., to powertrain ECU 102) in an on status 704 and output B (e.g., to infotainment system 112) in an off status 706.

Figure 8:
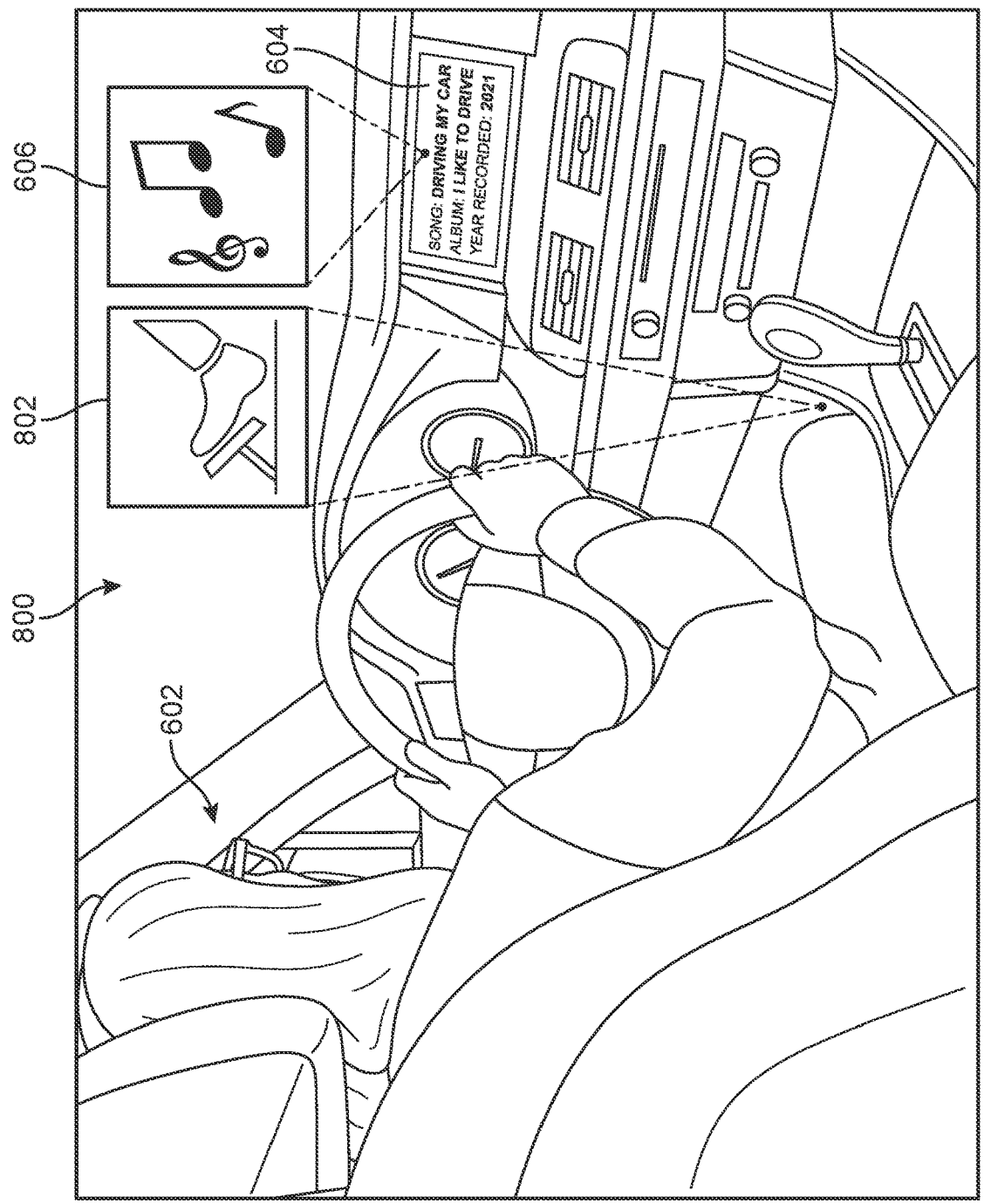
FIG. 8 is a representative view of an example embodiment of a third scenario for a power status output of an electric motor vehicle according to the method for controlling the keyless dual power control system.
Figure 8:
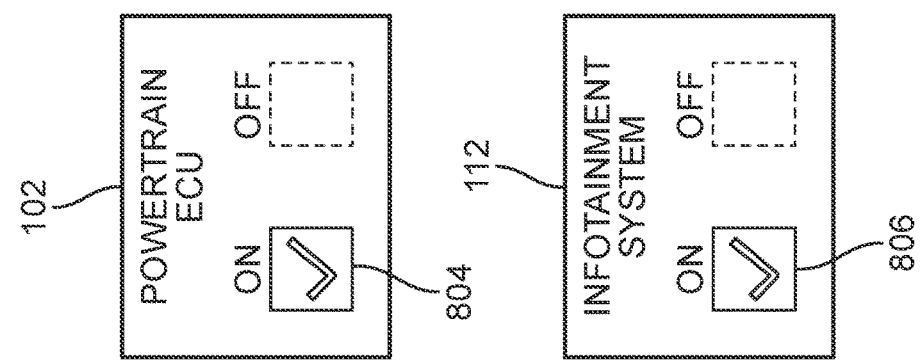

Referring now to FIG. 8, an example embodiment of a third scenario 800 for a power status output of electric motor vehicle 100 according to the method for controlling the keyless dual power control system 200 is shown. In this embodiment, third scenario 800 depicts driver 602 sitting in a driver's seat of electric motor vehicle 100 with the door closed. Accordingly, third scenario 800 illustrates a YES result for each of operation 404, operation 406, operation 408, and operation 410 of method 400. Additionally, third scenario 800 also shows a brake pedal pressed 802 by driver 602, illustrating a YES result for operation 502 of operation B 424, which causes keyless dual power control system 200 to automatically place electric motor vehicle 100 in third power output 314 associated with output A (e.g., to powertrain ECU 102) in an on status 804 and output B (e.g., to infotainment system 112) in an on status 806. As shown in FIG. 8, in third scenario 800, display screen 608 of infotainment system 112 is on and music 610 is playing through speakers and power is being provided to powertrain ECU so that electric motor vehicle 100 may be driven in third scenario 800.

Figure 9:
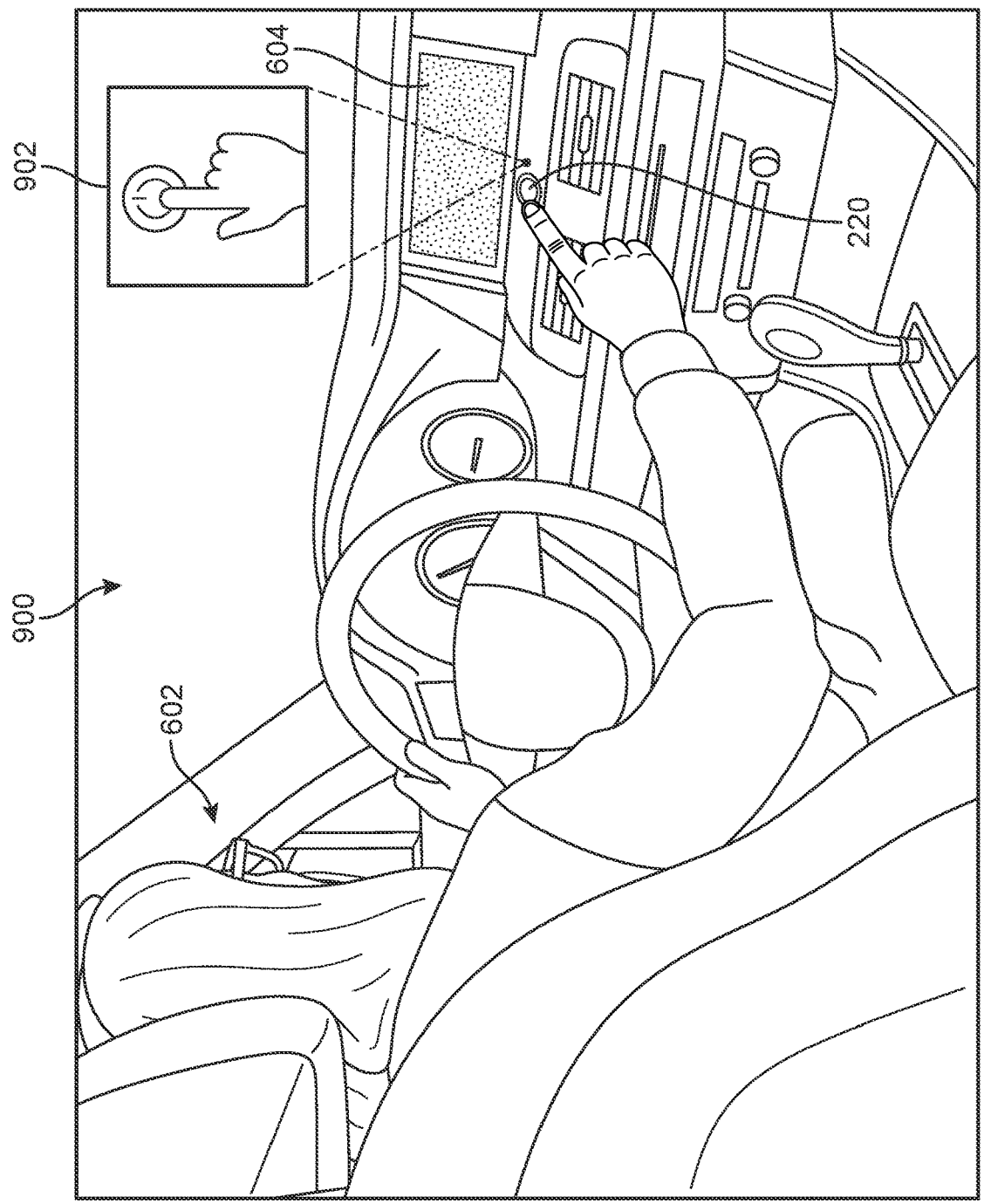
FIG. 9 is a representative view of an example embodiment of a fourth scenario for a power status output of an electric motor vehicle according to the method for controlling the keyless dual power control system.

Referring now to FIG. 9, an example embodiment of a fourth scenario 900 for a power status output of electric motor vehicle 100 according to the method for controlling the keyless dual power control system 200 is shown. In this embodiment, driver 602 is shown selecting power override 220 by pressing a button or other input 902 for more than a predetermined amount of time (e.g., a few seconds). Accordingly, operation 316 of method 300 determines that power override switch 220 has been pressed for the predetermined amount of time and keyless dual power control system 200 automatically sets electric motor vehicle 100 to fourth power output status 318 associated with output A (e.g., to powertrain ECU 102) in an off status 904 and output B (e.g., to infotainment system 112) in an off status. With this arrangement, fourth scenario 900 illustrates driver 602 being able to conveniently turn off all power within electric motor vehicle 100 (e.g., power to both powertrain ECU 102 and infotainment system 112) by pressing and holding power override switch 220 for a predetermined amount of time. As shown in fourth scenario 900, override switch 220 is located inside the passenger compartment of electric motor vehicle 100, for example, near or adjacent to display screen 608 of infotainment system 112, so that driver 602 may reach override switch 220 while inside electric motor vehicle 100.

Figure 10:
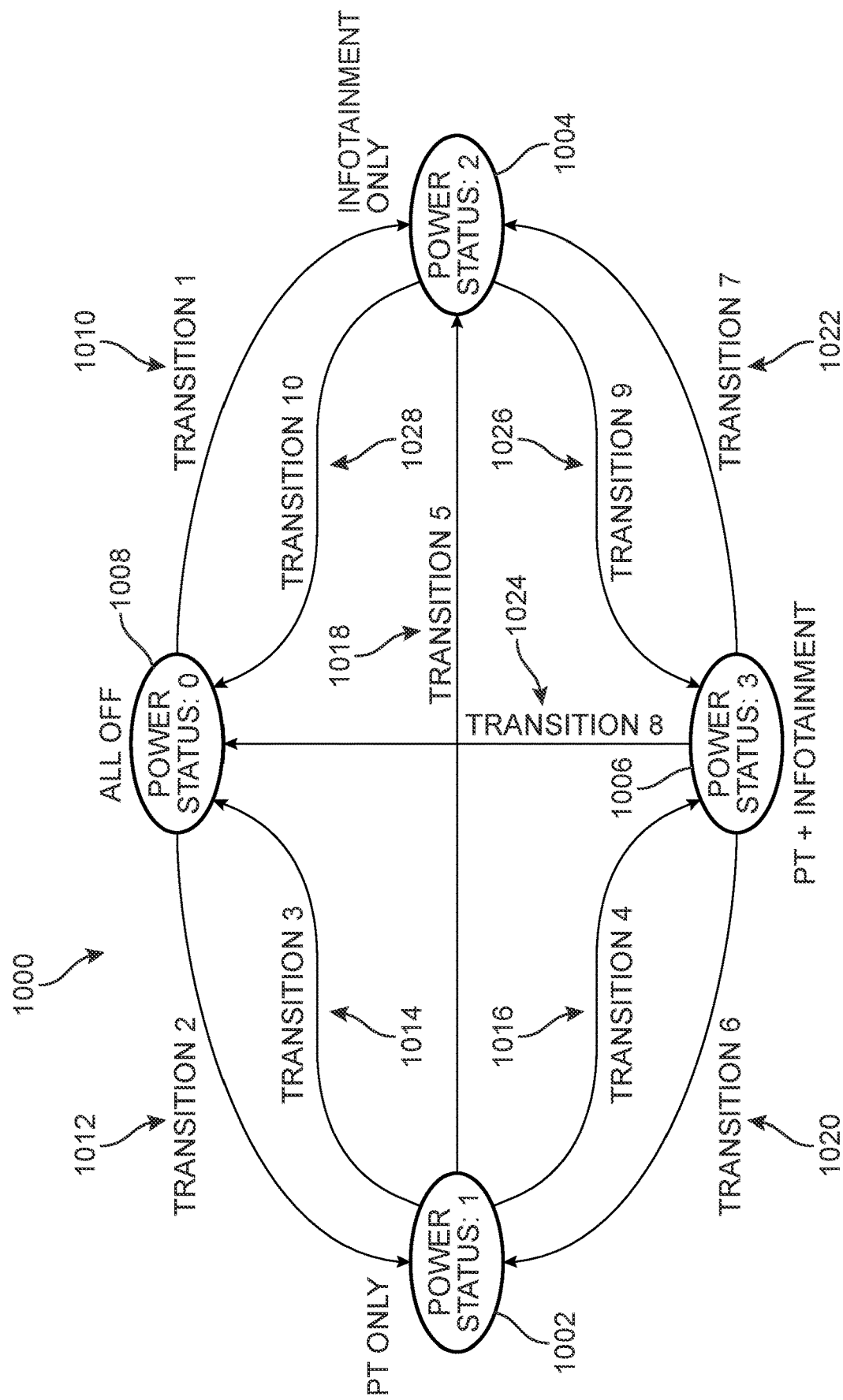
FIG. 10 is a schematic view of an example embodiment of a state diagram of the various power output statuses and transitions between each status implemented by the keyless dual power control system.

In some embodiments, the power output status of powertrain ECU 102 and/or infotainment system 112 may be transitioned from one status to another status by power control module 130 of keyless dual power control system 200 based on receiving inputs from one or more sensors of electric motor vehicle 100 that meet required conditions for the transition between statuses. Referring now to FIG. 10, a schematic view of an example embodiment of a state diagram 1000 of the various power output statuses and transitions between each status implemented by keyless dual power control system 200 is shown.

In this embodiment, state diagram 1000 shows each of the four possible power output statuses for powertrain ECU 102 and infotainment system 112 of electric motor vehicle 100. A shown in FIG. 10, state diagram 1000 includes a first power output status 1002 (e.g., power status=1) that is associated with first power output 306 where output A (e.g., to powertrain ECU 102) in an on status and output B (e.g., to infotainment system 112) in an off status. State diagram 1000 also includes a second power output status 1004 (e.g., power status=2) that is associated with second power output 310 where output A (e.g., to powertrain ECU 102) in an off status and output B (e.g., to infotainment system 112) in an on status.

State diagram 1000 further includes a third power output status 1006 (e.g., power status=3) that is associated with third power output 314 where output A (e.g., to powertrain ECU 102) in an on status and output B (e.g., to infotainment system 112) in an on status. State diagram 1000 also includes fourth power output status 1008 (e.g., power status=0) that is associated with fourth power output 318 also referred to as zero power output status to reflect that both output A and output B are in an off status (i.e., both powertrain ECU 102 and infotainment system 112 are turned off).

As shown in FIG. 10, state diagram 1000 illustrates the various transitions that are available between each of first power output status 1002, second power output status 1004, third power output status 1006, and fourth or zero power output status 1008. In this embodiment, state diagram 1000 shows a first transition 1010 from fourth or zero power output status 1008 to second power output status 1004, a second transition 1012 from fourth or zero power output status 1008 to first power output status 1002, a third transition 1014 from first power output status 1002 to fourth or zero power output status 1008, a fourth transition 1016 from first power output status 1002 to third power output status 1006, a fifth transition 1018 from first power output status 1002 to second power output status 1004, a sixth transition 1020 from third power output status 1006 to first power output status 1002, a seventh transition 1022 from third power output status 1006 to second power output status 1004, an eighth transition 1024 from third power output status 1006 to fourth or zero power output status 1008, a ninth transition 1026 from second power output status 1004 to third power output status 1006, and a tenth transition 1028 from second power output status 1004 to fourth or zero power output status 1008.

Each transition between one power output status to another power output status shown in state diagram 1000 may be implemented by power control module 130 of keyless dual power control system 200 upon receiving input signals from one or more sensors of electric motor vehicle 100 that match the unique conditions for each power status transition. The conditions associated with each of transitions 1010-1028 are described with reference to the table shown in FIG. 12, as detailed below.

Figure 11:
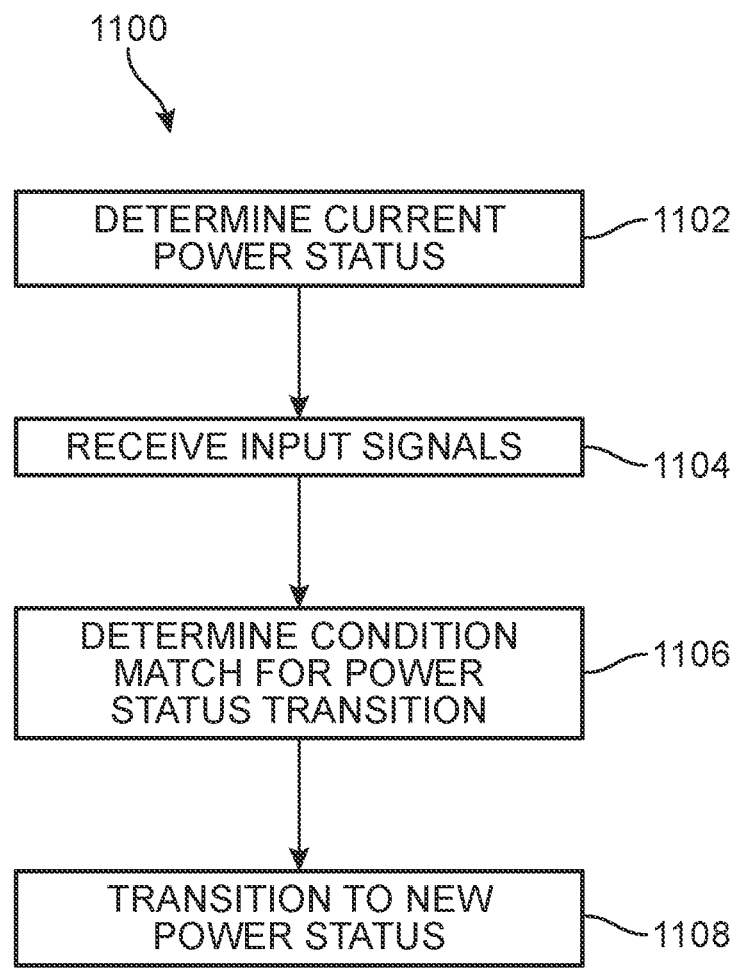
FIG. 11 is a flowchart of an example embodiment of a method for transitioning the electric motor vehicle between different power output statuses using the keyless dual power control system.

Referring now to FIG. 11, a flowchart of an example embodiment of a method 1100 for transitioning electric motor vehicle 100 between different power output statuses using keyless dual power control system 200 is shown. In an example embodiment, method 1100 is implemented by power control module 130 of keyless dual power control system 200 to determine when to transition powertrain ECU 102 and/or infotainment system 112 between an on status or an off status associated with each of first power output status 1002, second power output status 1004, third power output status 1006, and fourth or zero power output status 1008.

In this embodiment, method 1100 includes an operation 1102 where a current power status is determined. For example, as described above, operation 1102 may include determining which of first power output status 1002, second power output status 1004, third power output status 1006, and fourth or zero power output status 1008 is the current power status of electric motor vehicle 100. Next, method 1100 may proceed to an operation 1104. At operation 1104, one or more inputs signals from plurality of sensors 202 (e.g., wireless device 204, door sensors 206, seat pressure sensor 208, and/or brake pedal switch 210), battery SOC sensor 218, power override switch 220, park status sensor 222, and/or user feedback from infotainment system 112 may be received.

Upon receiving one or more input signals at operation 1104, method 1100 proceeds to an operation 1106. At operation 1106, a condition match for a power status transition is determined. The unique conditions for each power status transition 1010-1028 are described with reference to the table shown in FIG. 12, as detailed below. Upon determining at operation 1106 that the conditions match a specific power status transition, method 1100 proceeds to an operation 1108 where the transition to the new power output status is performed. The result of operation 1108 is to change at least one power output status of either or both of powertrain ECU 102 and infotainment system 112. With this arrangement, when the appropriate conditions are detected by power control module 130 of keyless dual power control system 200, the power output status of powertrain ECU 102 and/or infotainment system 112 may be automatically transitioned to the new power output statuses.

Referring now to FIG. 12, a table 1200 of the exemplary conditions from the plurality of inputs from electric motor vehicle 100 associated with the different transitions between each status shown in state diagram 1000 of FIG. 10 implemented by keyless dual power control system 200 is shown. In this embodiment, table 1200 includes a first column 1202 listing each transition 1010-1028, a second column 1204 with details of the transition change from the current power output status (e.g., on the left) to the new power output status (e.g., on the right), and a third column 1206 that includes the conditions required for each transition.

In an example embodiment, first transition 1010 (0→2) is associated with a first set of conditions 1208. In this embodiment, first set of conditions 1208 includes detecting a user authentication (authentication=true), for example, as part of authentication determination operation 212 in response to the signal from wireless device 204, detecting a driver's door has been opened (drv. door=open), for example, based on an input from door sensors 206, and detecting that the driver's seat is occupied (seat occupied=true), for example, based on the input from seat pressure sensor 208. In addition, first set of conditions 1208 also requires that at least one of infotainment system 112 being previously set to an on status (audio (previous)=on) or that a user has selected infotainment system 112 only (audio only req=true), for example, based on user feedback from infotainment system 112, as described above.

Upon meeting the requirements of first set of conditions 1208, power control module 130 may transition electric motor vehicle 100 from fourth or zero power output status 1008 to second power output status 1004. As a result, the power output status of infotainment system 112 changes from an off status to an on status, while powertrain ECU 102 remains in an off status.

Second transition 1012 (0→1) is associated with a second set of conditions 1210. In this embodiment, second set of conditions 1210 includes detecting a user authentication (authentication=true), for example, as part of authentication determination operation 212 in response to the signal from wireless device 204, detecting a driver's door has been opened (drv. door=open), for example, based on an input from door sensors 206, detecting that the driver's seat is occupied (seat occupied=true), for example, based on the input from seat pressure sensor 208, and detecting that the brake pedal has been pressed, for example, based on a signal from brake pedal switch 210. In addition, second set of conditions 1210 also requires that at least one of infotainment system 112 being previously set to an off status (audio (previous)=off) or that a user has not selected infotainment system 112 only (audio only req=false), for example, based on user feedback from infotainment system 112, as described above.

Upon meeting the requirements of second set of conditions 1210, power control module 130 may transition electric motor vehicle 100 from fourth or zero power output status 1008 to first power output status 1002. As a result, the power output status of powertrain ECU 102 changes from an off status to an on status, while infotainment system 112 remains in an off status.

Third transition 1014 (1→0) is associated with a third set of conditions 1212. In this embodiment, third set of conditions 1212 includes detecting that the driver's door has been closed (driver exit), for example, based on an input from door sensors 206, and that the vehicle is in park (vehicle parked), for example, based on a signal from park status sensor 222. Third set of conditions 212 may also be satisfied by detecting that the user has pressed and held power override switch 220 for more than a predetermined amount of time (pwr override sw=true>3 seconds).

Upon meeting either of the requirements of third set of conditions 1212, power control module 130 may transition electric motor vehicle 100 from first power output status 1002 to fourth or zero power output status 1008. As a result, the power output status of powertrain ECU 102 changes from an on status to an off status, while infotainment system 112 remains in an off status.

Fourth transition 1016 (1→3) is associated with a fourth set of conditions 1214. In this embodiment, fourth set of conditions 1214 includes that a user has selected infotainment system 112 only (audio only req=true), for example, based on user feedback from infotainment system 112, as described above, and that the state of charge of the battery is not low (battery SOC !=low), for example, based on comparing a signal from battery SOC sensor 218 to a predetermined threshold, as described above.

Upon meeting the requirements of fourth set of conditions 1214, power control module 130 may transition electric motor vehicle 100 from first power output status 1002 to third power output status 1006. As a result, the power output status of infotainment system 112 changes from an off status to an on status, while powertrain ECU 102 remains in an on status.

Fifth transition 1018 (1→2) is associated with a fifth set of conditions 1216. In this embodiment, fifth set of conditions 1216 requires that the vehicle is in park (vehicle parked=true), for example, based on a signal from park status sensor 222, and that a user has selected infotainment system 112 only (audio only req=true), for example, based on user feedback from infotainment system 112, as described above.

Upon meeting the requirements of fifth set of conditions 1216, power control module 130 may transition electric motor vehicle 100 from first power output status 1002 to second power output status 1004. As a result, the power output status of infotainment system 112 changes from an off status to an on status, while powertrain ECU 102 changes from an on status to an off status.

Six transition 1020 (3→1) is associated with a sixth set of conditions 1218. In this embodiment, sixth set of conditions 1218 requires either that a user has not selected infotainment system 112 only (audio only req=false), for example, based on user feedback from infotainment system 112, as described above, or that the state of charge of the battery is low (battery SOC=low), for example, based on comparing a signal from battery SOC sensor 218 to a predetermined threshold, as described above.

Upon meeting the requirements of sixth set of conditions 1218, power control module 130 may transition electric motor vehicle 100 from third power output status 1006 to first power output status 1002. As a result, the power output status of infotainment system 112 changes from an on status to an off status, while powertrain ECU 102 remains in an on status.

Seventh transition 1022 (3→2) is associated with a seventh set of conditions 1220. In this embodiment, seventh set of conditions 1220 requires that the vehicle is in park (vehicle parked), for example, based on a signal from park status sensor 222, and that a user has selected infotainment system 112 only (audio only req=true), for example, based on user feedback from infotainment system 112, as described above.

Upon meeting the requirements of seventh set of conditions 1220, power control module 130 may transition electric motor vehicle 100 from third power output status 1006 to second power output status 1004. As a result, the power output status of powertrain ECU 102 changes from an on status to an off status, while infotainment system 112 remains in an on status.

Eighth transition 1024 (3→0) is associated with an eighth set of conditions 1222. In this embodiment, eighth set of conditions 1222 includes detecting that the driver's door has been closed (driver exit), for example, based on an input from door sensors 206, and that the vehicle is in park (vehicle parked), for example, based on a signal from park status sensor 222. Eighth set of conditions 1222 may also be satisfied by detecting that the user has pressed and held power override switch 220 for more than a predetermined amount of time (pwr override sw=true>3 seconds).

Upon meeting the requirements of eighth set of conditions 1222, power control module 130 may transition electric motor vehicle 100 from third power output status 1006 to fourth or zero power output status 1008. As a result, the power output status of infotainment system 112 changes from an on status to an off status and powertrain ECU 102 also changes from an on status to an off status.

Ninth transition 1026 (2→3) is associated with a ninth set of conditions 1224. In this embodiment, ninth set of conditions 1224 requires detecting that the driver's seat is occupied (seat occupied=true), for example, based on the input from seat pressure sensor 208, and detecting that the brake pedal has been pressed, for example, based on a signal from brake pedal switch 210.

Upon meeting the requirements of ninth set of conditions 1224, power control module 130 may transition electric motor vehicle 100 from second power output status 1004 to third power output status 1006. As a result, the power output status of powertrain ECU 102 changes from an off status to an on status, while infotainment system 112 remains in an on status.

Tenth transition 1028 (2→0) is associated with a tenth set of conditions 1226. In this embodiment, tenth set of conditions 1226 includes detecting that the driver's door has been closed (driver exit), for example, based on an input from door sensors 206, and that the vehicle is in park (vehicle parked), for example, based on a signal from park status sensor 222. Tenth set of conditions 1226 may also be satisfied by detecting that the user has pressed and held power override switch 220 for more than a predetermined amount of time (pwr override sw=true>3 seconds). Additionally, tenth set of conditions 1226 may further be satisfied by determining that the state of charge of the battery is low (battery SOC=low), for example, based on comparing a signal from battery SOC sensor 218 to a predetermined threshold, as described above.

Upon meeting the requirements of tenth set of conditions 1226, power control module 130 may transition electric motor vehicle 100 from second power output status 1004 to fourth or zero power output status 1008. As a result, the power output status of infotainment system 112 changes from an on status to an off status, while powertrain ECU 102 remains in an off status.

With this arrangement, power control module 130 of keyless dual power control system 200 may transition the power output status of powertrain ECU 102 and/or infotainment system 112 from a current status to a new status based on receiving inputs from one or more sensors of electric motor vehicle 100 that meet required conditions for the transition between statuses, as detailed in table 1200 of FIG. 12.

The keyless dual power control system and method described herein allows a driver to control the powertrain ECU and the infotainment system of an electric motor vehicle without a traditional key or a start button. A key fob or other authentication device (e.g., smartphone) is used for user authentication, however, no additional purposeful input from the driver (i.e., no turning of a traditional key or pressing a start button) is required to power on the powertrain ECU. Furthermore, the techniques described herein presents a previously unavailable option to the driver, that is, the option to power on the infotainment system of the electric motor vehicle without powering on the powertrain ECU.

The present embodiments provide seamless power control for an electric motor vehicle without additional button presses, making the experience for the driver easy to get into the vehicle and go. A manual override switch to power off both the powertrain ECU and infotainment system is provided for convenience. A driver is able to access the electric motor vehicle without unexpected power usage via infotainment system or other systems and also has the ability to control infotainment power independently from the powertrain ECU power. Power to both the powertrain ECU and infotainment system will switch off once the driver has exited the electric motor vehicle and closed the door.

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above may be combined in part or in whole in accordance with the principles described herein. Accordingly, the embodiments are not to be restricted except in light of the attached claims and their equivalents. Also, various modifications and changes may be made within the scope of the attached claims.

The invention claimed is:

1. A method for keyless dual power system control for an electric motor vehicle having a powertrain electronic control unit (ECU) and an infotainment system that are independently powered, the method comprising:
receiving a user authentication from a wireless device to authenticate a user to the electric motor vehicle;
receiving a driver's door status from a door sensor of the electric motor vehicle indicating whether the driver's door status is an open status or a closed status;
receiving a driver presence signal from a seat pressure sensor of the electric motor vehicle;
determining whether the driver's door status from the door sensor indicates the driver's door has been opened; and
wherein upon receiving the user authentication, determining the driver's door has been opened, and receiving the driver presence signal, controlling the infotainment system to be in an on status and controlling the powertrain ECU to be in an off status.

2. The method according to claim 1, further comprising:
receiving user feedback from the infotainment system; and
in response to the user feedback, controlling the infotainment system to be in an off status.

3. The method according to claim 1, further comprising:
determining whether the driver's door status from the door sensor indicates the driver's door has changed from the open status to a closed status;
receiving a signal from a brake pedal switch indicating a brake pedal of the electric motor vehicle has been pressed; and
wherein upon determining the driver's door status has changed from the open status to the closed status and receiving the signal from the brake pedal switch indicating the brake pedal has been pressed, controlling the powertrain ECU from the off status to an on status.

4. The method according to claim 1, further comprising:
receiving a state of charge (SOC) of a battery of the electric motor vehicle from a battery SOC sensor, the battery providing power to the powertrain ECU;
comparing the SOC of the battery from the battery SOC sensor to a predetermined threshold; and
upon determining that the SOC of the battery is below the predetermined threshold, controlling the infotainment system from the on status to an off status.

5. The method according to claim 4, wherein the predetermined threshold is between 5% and 10% of a total charge of the battery.

6. The method according to claim 1, wherein the powertrain ECU is associated with a battery configured to provide power to at least an electric motor of the electric motor vehicle and wherein the infotainment system is associated with an accessory battery separate from the battery associated with the powertrain ECU.

7. The method according to claim 6, wherein the battery associated with the powertrain ECU is a high-voltage battery providing at least above 60 volts and the accessory battery provides 12 volts.

8. The method according to claim 1, further comprising:
receiving a signal from an override switch of the electric motor vehicle; and
upon receiving the signal from the override switch, automatically controlling both the powertrain ECU and the infotainment system to an off status.

9. A system for controlling a keyless dual power system of an electric motor vehicle; the system comprising:
a powertrain electronic control unit (ECU) configured to control at least an electric motor of the electric motor vehicle;
an infotainment system that is independently powered from the powertrain ECU;
at least one door sensor associated with a driver's door of the electric motor vehicle;
a seat pressure sensor configured to detect a driver's presence in a driver's seat of the electric motor vehicle;
a brake pedal switch associated with a brake pedal of the electric motor vehicle, the brake pedal switch configured to detect when the brake pedal has been pressed; and
a power control module, the power control module including at least one processor that:
receives a user authentication from a wireless device to authenticate a user to the electric motor vehicle;
receives a driver's door status from the at least one door sensor;
receives a driver presence signal from the seat pressure sensor;
determines whether the driver's door status from the at least one door sensor indicates the driver's door has been opened; and
upon receiving the user authentication, determining the driver's door has been opened, and receiving the driver presence signal, controls the infotainment system to be in an on status and controls the powertrain ECU to be in an off status.

10. The system according to claim 9, wherein the power control module receives user feedback from the infotainment system; and
in response to the user feedback, controls the infotainment system to be in an off status.

11. The system according to claim 9, wherein the power control module:
determines whether the driver's door status from the at least one door sensor indicates the driver's door has changed from the open status to a closed status;
receives a signal from the brake pedal switch indicating the brake pedal of the electric motor vehicle has been pressed; and
wherein upon determining the driver's door status has changed from the open status to the closed status and receiving the signal from the brake pedal switch indicating the brake pedal has been pressed, the power control module controls the powertrain ECU from the off status to an on status.

12. The system according to claim 9, further comprising:
a battery SOC sensor associated with a battery of the electric motor vehicle that provides power to the powertrain ECU;
wherein the power control module:
receives a state of charge (SOC) of the battery from the battery SOC sensor;
compares the SOC of the battery to a predetermined threshold; and
upon determining that the SOC of the battery is below the predetermined threshold, controls the infotainment system from the on status to an off status.

13. The system according to claim 12, wherein the predetermined threshold is between 5% and 10% of a total charge of the battery.

14. The system according to claim 9, further comprising:
a battery associated with the powertrain ECU configured to provide power to at least the electric motor of the electric motor vehicle; and
an accessory battery separate from the battery associated with the powertrain ECU configured to provide power to the infotainment system.

15. The system according to claim 14, wherein the battery associated with the powertrain ECU is a high-voltage battery providing at least above 60 volts and the accessory battery provides 12 volts.

16. The system according to claim 9, further comprising:
an override switch associated with the electric motor vehicle; and
wherein the power control module receives a signal from the override switch and automatically controls both the powertrain ECU and the infotainment system to an off status.

17. An electric motor vehicle, comprising:
an electric motor;
a powertrain electronic control unit (ECU) configured to control at least the electric motor;
a battery associated with the powertrain ECU configured to provide power to at least the electric motor;
an infotainment system that is independently powered from the powertrain ECU; and
a keyless dual power control system, comprising:
at least one door sensor associated with a driver's door of the electric motor vehicle;
a seat pressure sensor configured to detect a driver's presence in a driver's seat of the electric motor vehicle;
a brake pedal switch associated with a brake pedal of the electric motor vehicle, the brake pedal switch configured to detect when the brake pedal has been pressed; and
a power control module, the power control module including at least one processor that:
receives a user authentication from a wireless device to authenticate a user to the electric motor vehicle;
receives a driver's door status from the at least one door sensor;
receives a driver presence signal from the seat pressure sensor;
determines whether the driver's door status from the at least one door sensor indicates the driver's door has been opened; and
upon receiving the user authentication, determining the driver's door has been opened, and receiving the driver presence signal, controls the infotainment system to be in an on status and controls the powertrain ECU to be in an off status.

18. The electric motor vehicle according to claim 17, further comprising:
an accessory battery configured to provide power to the infotainment system, wherein the accessory battery is separate from the battery associated with the powertrain ECU.

19. The electric motor vehicle according to claim 18, wherein the battery associated with the powertrain ECU is a high-voltage battery providing at least above 60 volts and the accessory battery provides 12 volts.

20. The electric motor vehicle according to claim 17, further comprising:
an override switch located within a passenger compartment of the electric motor vehicle; and
wherein upon receiving a signal from the override switch, the power control automatically controls both the powertrain ECU and the infotainment system to an off status.

* * * * *